…

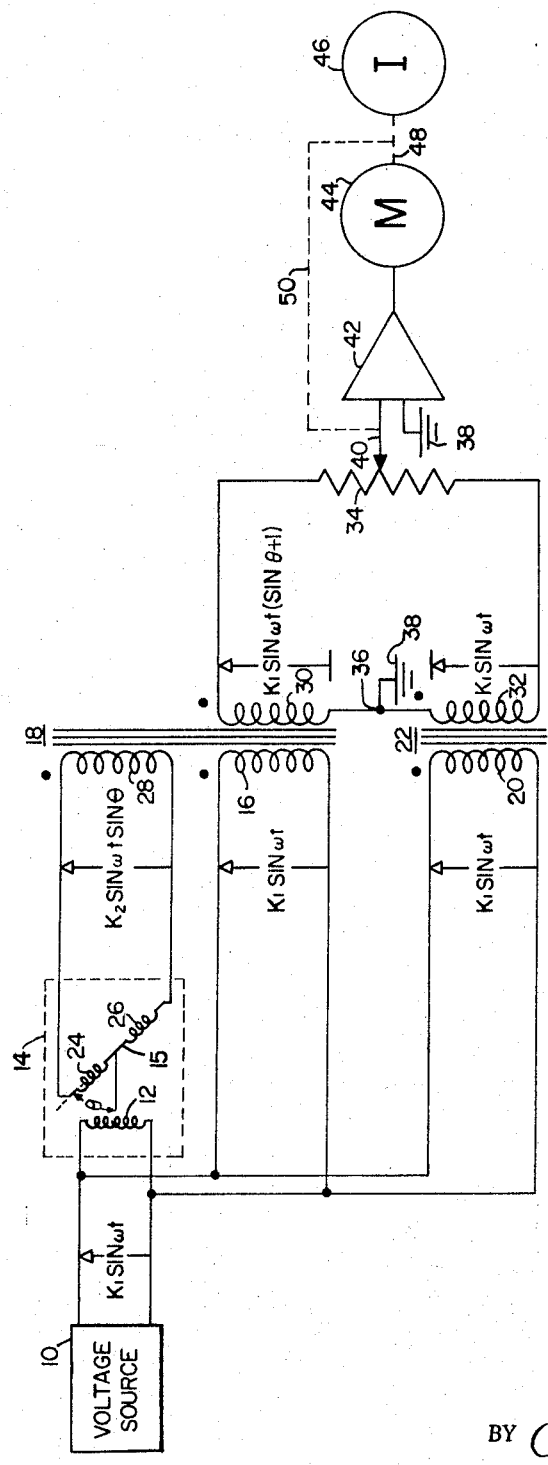

United States Patent Office 3,351,952
Patented Nov. 7, 1967

3,351,952
ANGULAR POSITION INDICATORS
Patrick J. Kobold and Robert M. Thomas, St. Paul, Minn.,
assignors to Honeywell Inc., a corporation of Delaware
Filed Nov. 23, 1964, Ser. No. 412,961
5 Claims. (Cl. 340—187)

ABSTRACT OF THE DISCLOSURE

Apparatus for indicating the angular position of a synchro resolver, including a pair of transformers arranged in a null type bridge circuit for converting the normal resolver output signal into a form usable to actuate a closed loop indicator servomechanism.

This invention relates in general to angular position indicators and in particular to a unique angular position indicator wherein the angular position of a synchro-resolver is indicated by a servo-rebalance type indicator.

Synchro-resolvers are widely used in angular position indicators as transmitters of angular information. Inherent disadvantages accompany the use of synchro-resolvers in conjunction with a pure synchro indicating system. Deterioration of the transmitter and system torque gradient are caused by loading effects. This deterioration causes a decrease in the overall system and indicator accuracy. It can also cause instability in the system that often results in undesirable oscillations.

Many synchro systems are presently employed where the rotor of a synchro transmitter is connected to a condition responsive member so that the position of the rotor is indicative of the condition. A remote synchro receiver electrically connected to the transmitter operates an indicator thereby providing remote indication. The receiver indicator provides a load that is reflected into the transmitter that frequently produces undesirable effects, especially when there is a failure in the remote synchro.

The present invention overcomes this problem by isolating the loading effects of the remote indicator. Furthermore the present invention utilizes much of the apparatus presently used in many installations so as to minimize cost and difficulty involved.

Briefly the output of the synchro transmitter is presented as one input to a rebalanceable bridge network the output of which provides an indication of the position of the transmitter rotor.

Using the output of the transmitting synchro-resolver in conjunction with a servo-rebalance network apparatus eliminates the aforementioned disadvantages. The servo approach provides a constant load to the synchro-resolver. The reflection of the servo system loading into the sychro-resolver is minimized and complete indicator failure cannot affect the basic synchro control function.

In order to use servo rebalance techniques where the output of a synchro resolver serves as an input, a special circuit is utilized to convert the resolver output to a signal suitable for such use. Briefly the synchro resolver signal is summed with a second signal and the sum is compared with a third signal in a transformer circuit to provide a signal suitable for use with a servo rebalance indicator system.

Accordingly it is an object of this invention to provide improved indicating apparatus.

For a better understanding of the invention and to determine how this object and other objects and advantages are accomplished, reference is had to the following detailed description in conjunction with the accompanying drawing.

In the figure, a source of voltage 10 is shown connected to a stator winding 12 of a synchro resolver 14 having a rotor 15. In a common installation rotor 15 would be positioned by some condition indicating apparatus (not shown) and the output of resolver 14 would be connected to a remote synchro indicator. As explained overloading of the indicator mechanism at the remote location of such a system causes undesirable effects to be reflected into the synchro resolver 14.

To avoid this problem the present invention replaces the remote synchro indicator with the apparatus shown in the drawing. Excitation voltage from source 10 is applied to primary winding 16 of a transformer 18, and primary winding 20 of a transformer 22 in addition to the stator winding of synchro resolver 10. The excitation voltage is sinusoidal and will be assumed to have the form $K_1 \sin \omega t$. The output of the synchro resolver 14 is produced across a pair of windings 24 and 26 wound on the rotor 15 of synchro resolver 14. The output produced by synchro resolver 14 is connected across primary winding 28 of a transformer 18. The output of synchro resolver 14 will be assumed to be of the form $K_2 \sin (\omega t) \sin \theta$, where $\theta$ represents the angle made by the rotor of synchro resolver 14 with respect to the horizontal. A secondary winding 30 of transformer 18 and a secondary winding 32 of transformer 22 are connected in series with a rebalance potentiometer 34. A junction point 36, common to windings 30 and 32 is connected to ground 38. A wiper 40 on potentiometer 34 is connected to the input of an amplifier 42, amplifier 42 providing a signal used to drive a phase sensitive motor 44. Motor 44 provides mechanical drive to an indicator 46 as shown by dashed line 48 and a mechanical drive to wiper 40 of potentiometer 34 as shown by dashed line 50. The upper ends of windings 28, 16, 20, 30, and 32 are dotted to indicate that these ends are in phase.

It may be shown that the voltage developed across secondary winding 30 of transformer 18 has the form $K_1 \sin \omega t (\sin \theta + 1)$. For this to be true the turns ratio of winding 28 to winding 30 must be $K_1/K_2$ and the turns ratio of winding 16 to winding 30 must be 1/1. The voltae produced across secondary winding 32 of transformer 22 has the same form as that voltage impressed across primary winding 20 of transformer 22, i.e., $K_1 \sin \omega t$.

In describing the operation of the system, it will be assumed that the rotor of resolver 14 can assume any angle between −90° and +90°, that the angle so assumed is positive and that the system is balanced. System balance implies that the wiper 40 of potentiometer 34 is at virtual ground. As the angle of the rotor 15 slowly increases assume that the dotted end of winding 28 on transformer 18 becomes more positive, inducing additional voltage in winding 30 of transformer 18 causing current to flow down through the upper end of potentiometer 34 to wiper 40 and through the input impedance of amplifier 42 to ground 38, causing the wiper arm 40 to become positive. The positive voltage appearing at wiper 40 is amplified by amplifier 42 and causes the phase sensitive motor 44 to drive indicator 46 and to move wiper 40 of potentiometer 34 back to virtual ground. The angle indicated by indicator 46 is a function of the angle, $\theta$, assumed by the rotor of resolver 14.

If, on the other hand, the angle $\theta$ of the rotor of resolver 14 had become smaller the voltage appearing at the dotted end of winding 28 of transformer 18 would have been negative going, the voltage at the dotted end of winding 30 of transformer 18 would also have been negative going causing current to flow through the input impedance of amplifier 42 in an opposite direction thereby causing a negative voltage to appear at wiper 40. This negative voltage would be amplified by amplifier 42 and since it is of opposite phase would have driven motor 44 in the opposite direction until wiper arm 40 was again resting at virtual ground. There is another way to look at the voltage developed at wiper arm 40 of rebalance potentiometer 34. The voltage across the secondary winding 30 of transformer 18 is always being compared with the voltage produced across the secondary winding 32 of transformer 22. The phase of the voltage appearing at wiper arm 40 depends upon whether the voltage developed across secondary winding 30 of transformer 18 becomes smaller or becomes larger when the rotor of resolver 14 rotates. When $\theta$ is zero, the voltage developed across windings 30 and 32 are equal though out of phase. When $\theta$ is positive, the voltage across winding 30 is less than that across winding 32. As $\theta$ changes, the wiper 40 of rebalance potentiometer 34 also changes always assuming the position of virtual ground. It is seen that the voltages impressed across primary windings 26, 16 of transformer 18 combine in the secondary winding 30 to produce a voltage that does not change sense with variations in $\theta$. It is also seen that the voltages produced across secondary winding 30 of transformer 18 and secondary winding 32 of transformer 22 are out of phase with each other with respect to ground. More particularly, they are 180° out of phase.

The transformers 18 and 22 provide electrical isolation between the bridge network and the synchro resolver 14. Complete failure of the indicator mechanism will not affect the synchro resolver 14 which in most cases will be performing a control function. Potentiometer 12 can be easily characterized by standard techniques to provide a linear indication.

Thus it can be seen that a novel angular position indicator having a synchro resolver input and a servo rebalance output is provided. It represents a technique that is very useful in upgrading existing synchro systems.

Various modifications may be made within the spirit of the invention by those skilled in the art. It is to be understood that this invention is to be limited only to the extent of the appended claims.

We claim:
1. A circuit utilizing the output of a synchro resolver in a rebalanceable bridge, said resolver being energized by a source of sinusoidal voltage, comprising in combination:
 a first transformer having first and second primary windings and a secondary winding, the first primary winding being energized by the output of said resolver, the second primary winding being energized by said source, the secondary winding serving to sum, with respect to ground, the inputs of the first and second primary windings;
 a second transformer having a primary and a secondary winding, the primary winding of said second transformer energized by said source, the secondary winding of said second transformer developing a voltage substantially equal to the voltage across the primary winding of said second transformer, the secondary windings of said first and second transformers being connected in series, the voltages induced in the secondary windings being of opposite phase with respect to ground.

2. Apparatus for use with an induction resolver, said resolver having a fixed voltage input signal of the form $K_1 \sin \omega t$, an angular displacement input signal $\theta$, and producing a voltage output signal substantially of the form of $K_2 \sin (\omega t) \sin \theta$, comprising in combination:
 first transformer means connected to receive the voltage output signal and the voltage input signal and sum them, thereby obtaining a second voltage output signal substantially of the form $K_1 \sin \omega t (\sin \theta + 1)$;
 second transformer means connected to receive the voltage input signal and invert it, for obtaining a third voltage output signal substantially of the form $-K_1 \sin \omega t$; and
 potentiometer means connected in series with the second and third voltage output signals and summing them.

3. An angular position indicator comprising, in combination:
 a fixed source of excitation voltage;
 a resolver, energized by said source, having an angular displacement input within a predetermined range of angles;
 first means, energized by said resolver and by said source for producing a fixed phase signal having an amplitude determined by the angular displacement of said resolver;
 second means, energized by said source, for producing a signal of opposite phase with respect to the fixed phase signal;
 nullable third means for adding the signal produced by said first and second means, producing a resultant signal having one of two possible phases depending upon whether the angular displacement of said resolver has increased or decreased;
 phase sensitive means actuated by the signal produced by said third means;
 indicator means actuated by said phase sensitive means; and
 means actuated by said phase sensitive means for nulling said third means.

4. An angular position indicator comprising, in combination:
 a resolver having a stator winding and a rotor winding;
 a source of voltage, energizing said stator winding;
 a first transformer having first and second primary windings and a secondary winding, the first primary winding connected to be energized by said rotor winding, the second primary winding connected to be energized by said source;
 a second transformer having a primary and a secondary winding, the primary winding connected to be energized by said source;
 a potentiometer connected in series with the secondary windings of the first and second transformer, the secondary windings being grounded at a common junction point and oppositely phased with respect to ground;
 an amplifier having an input means connected to a wiper on said potentiometer, and an output means;
 an indicator;
 a phase sensitive motor having an output means and an input means, said input means connected to be energized by the output means of said amplifier, the output means connected to actuate said indicator and wiper of said potentiometer.

5. Apparatus for indicating the angular position of a synchro resolver comprising, in combination:
 a source of sinusoidal voltage of the form $K_1 \sin \omega t$ energizing said resolver, said resolver having an output voltage of the form $K_2 \sin (\omega t) \sin \theta$, $\theta$ representing the angular position of said resolver, $K_1$ and $K_2$ representing constants;
 a first transformer with first and second primary windings and a secondary winding, the first and second primary windings being energized with the voltages $K_2 \sin (\omega t) \sin \theta$ and $K_1 \sin \omega t$ respectively, the windings turns ratio selected such that the voltage across the output winding has the form $K_1 \sin \omega t (\sin \theta + 1)$;
 a second transformer having a primary winding and a secondary winding, the primary winding being energized by the voltage $K_1 \sin \omega t$, the voltage produced across the secondary winding being of the form $-K_1 \sin \omega t$;
 a rebalanceable potentiometer, having a wiper, connected in series with the secondary windings of said first and second transformers, the secondary windings being connected in series and grounded at a common junction;
means for amplifying an error signal appearing at the potentiometer wiper;
indicator means; and
phase sensitive motor means driven by said amplifying means connected to drive said indicator and the wiper on said rebalanceable potentiometer.

References Cited

UNITED STATES PATENTS

| | | | |
|---|---|---|---|
| 3,141,120 | 7/1964 | Johnson | 318—28 |
| 3,196,428 | 7/1965 | Spaulding | 318—28 |

NEIL C. READ, *Primary Examiner.*

T. B. HABECKER, *Assistant Examiner.*